July 18, 1961     E. A. HIRZEL     2,992,860
ANTI-SKID APPARATUS USING STRAIN GAUGE DETECTORS
Filed May 22, 1959                   2 Sheets-Sheet 1

*INVENTOR.*
EDGAR A. HIRZEL
BY
*J. B. Holden*
ATTORNEY

July 18, 1961 E. A. HIRZEL 2,992,860
ANTI-SKID APPARATUS USING STRAIN GAUGE DETECTORS
Filed May 22, 1959 2 Sheets-Sheet 2

INVENTOR.
EDGAR A. HIRZEL
BY
*J. B. Holden*
ATTORNEY

United States Patent Office 2,992,860
Patented July 18, 1961

2,992,860
ANTI-SKID APPARATUS USING STRAIN GAUGE DETECTORS
Edgar A. Hirzel, Cuyahoga Falls, Ohio, assignor to The Goodyear Tire & Rubber Company, Akron, Ohio, a corporation of Ohio
Filed May 22, 1959, Ser. No. 815,032
9 Claims. (Cl. 303—24)

The present invention relates to apparatus for detecting a skid or the beginning of a skid in a braked wheel, and for relieving the braking force to relieve or prevent the skid, and, more particularly, is concerned with strain gauges for sensing the skid and for initiating the operation of skid reducing or eliminating operations.

Heretofore, it has been proposed to reduce the skidding of braked wheels, such as railroad, aircraft, and other wheels by the provision of mechanical sensing mechanism, usually including a weight movable with the braked wheel and adapted to override, i.e., continue its rotation, when a wheel is braked too rapidly and goes into a skid. The overriding weight will operate mechanical linkage or electrical switching means to reduce braking force.

Electrical systems have likewise been provided including comparison systems between generators driven by braked and unbraked wheels so that if the braked wheel goes into a skid the sensing system is unbalanced to operate to relieve braking force. Other electrical sensing systems charge a condenser from the output of a generator driven by the braked wheel, and with the system operating when the wheel is braked into a skid to discharge the condenser to operate control relays for relieving braking force.

All known anti-skid systems thus are tied in mechanically or electrically with a rotating wheel or wheels, with the attendant problems of obtaining a mechanical or an electrical signal from a rotating wheel or wheels. Also, known anti-skid systems are open to the objection that they require space which is at a distinct premium in wheel, brake, and axle constructions, particularly on airplanes, and many known anti-skid systems add considerable weight to an aircraft which is undesirable from a payload standpoint.

It is the general object of the present invention to avoid and overcome the foregoing and other difficulties of and objections to known anti-skid systems for braked wheels by the provision of a relatively simple, inexpensive, durable and lightweight anti-skid apparatus which has no mechanical or electrical inter-connection with the braked wheel, but which can be mounted upon the axle, the strut, or other means rotatably supporting the wheel, but not in itself rotating.

Another object of the invention is the provision of anti-skid apparatus utilizing strain gauge means for measuring brake drag and/or brake torque and capable of sensing a skid or the beginning of a skid in a braked wheel.

Another object of the invention is the provision of apparatus of the character described wherein the difference betwen brake torque and brake drag can be measured by strain gauge means upon the support rotatably carrying the wheel, the difference being an indication of wheel deceleration, and with the difference being utilized to reduce the braking force and prevent a wheel skid.

The foregoing objects of the invention, and other objects which will become apparent as the description proceeds, are achieved, in one embodiment of the invention, by the combination of a wheel, means for rotatably supporting the wheel, a brake on the wheel, means for applying the brake, a strain gauge on the supporting means and measuring drag on the supporting means due to brake application, a strain gauge on the supporting means and measuring brake torque on the supporting means due to brake application, electrical means connected to the strain gauges and determining the deflection differences caused by the drag and the torque on the supporting means, and means for releasing the brake applying means when the difference determined by the electrical means is sufficient to indicate the development of a wheel skid.

For a better understanding of the invention reference should be had to the drawings wherein: FIG. 1 indicates in front elevation a strut supporting a brake airplane wheel, and strain gauges secured to the strut in accord with the present invention;

Figure 1:
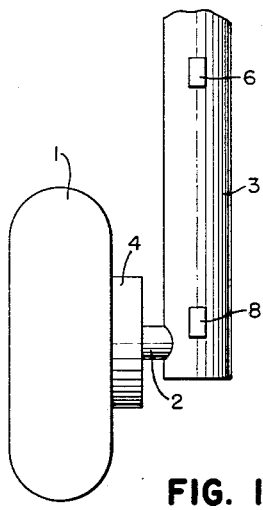
Figure 2:
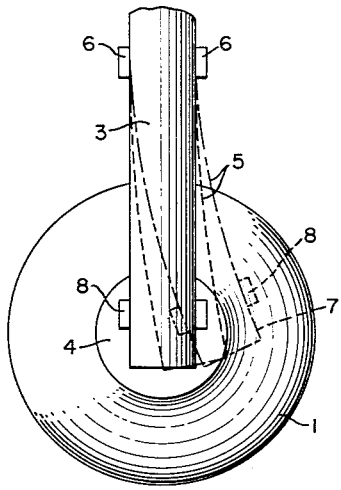
FIG. 2 is a side elevation of the wheel and strut shown in FIG. 1.

In the drawings, and in the form of the invention shown in FIGS. 1 and 2, the numeral 1 indicates a wheel rotatably mounted upon a stub axle 2 carried by a support strut 3, for example of an airplane, and with the wheel 1 being adapted to be braked by a brake 4.

Upon brake application the drag between the surface of the wheel and the ground or surface upon which the wheel rides results in the creation of a bending moment on the strut 3 tending to and actually bending the strut towards or into the somewhat exaggerated position shown by the dotted line 5. Thus, if one or more strain gauges 6 are applied to the strut 3 at some point along the length thereof wherein the stresses in the strut are due primarily to the bending moment created by brake drag then the strain on the gauges 6 becomes an indication of such brake drag and bending moment.

Likewise, it has been found upon the application of the brake 4 that the resulting brake torque creates an additional moment on the strut 3 tending to rotate the lower end of the strut, for example towards or into a position shown somewhat exaggerated by the chain dotted line 7. Now if one or more strain gauges 8 are positioned on the strut 3 in the region thereof most subject to the moments due to brake torque, then the strain gauges 8 produce an indication of brake torque.

Figure 3:
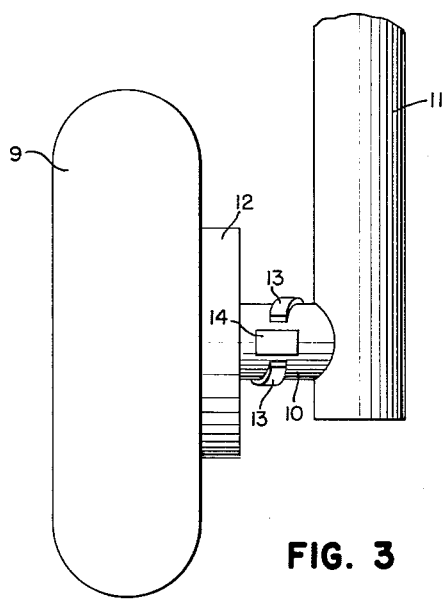
FIG. 3 is a view similar to FIG. 1 but illustrating a modification of the invention in which the strain gauges are applied to the axle carrying the braked wheel.
Figure 4:
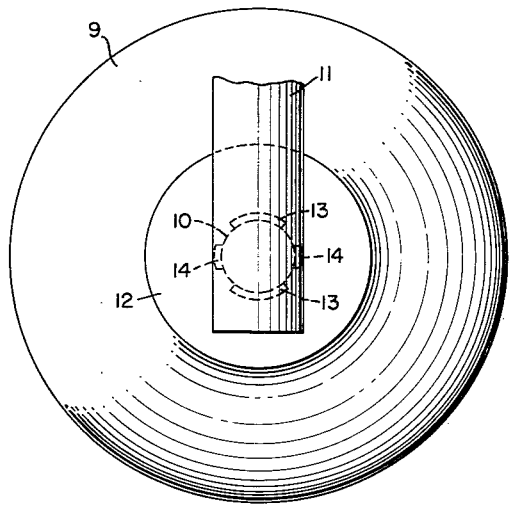
FIG. 4 is a side elevation of the wheel and supporting means of FIG. 3.

FIGS. 3 and 4 of the drawings illustrate the application of strain gauge means to the axle. More specifically, in this embodiment of the invention a wheel 9 is rotatably supported on an axle 10 carried by a support strut 11, and with a brake 12 carried by the axle 10 serving to brake the wheel 9. For measuring strains in the axle or moments due to brake torque strain gauge means, usually a pair of gauges 13, are secured to the axle 10, for example at diametrically opposed points thereof and at a slight angle to the circumference. To measure brake drag, i.e. bending moments on the axle due to the drag between the wheel 9 and its supporting surface, strain gauge means, usually a pair of strain gauges 14, are secured at diametrically opposed horizontal portions of the axle 10.

Figure 5:
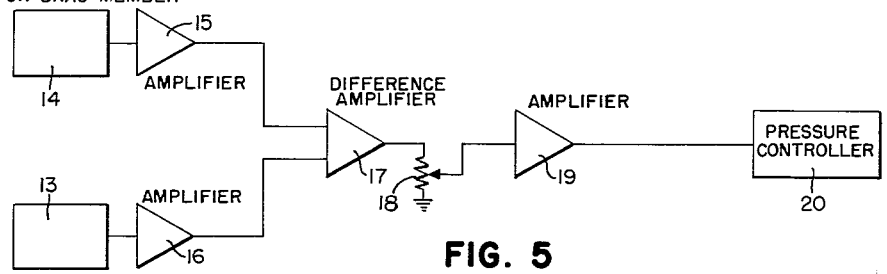
FIG. 5 is a schematic wiring diagram of one embodiment of the apparatus of the invention.

Turning now to FIG. 5, this indicates diagrammatically the manner of electrically connecting the strain gauges of FIGS. 1 to 4 into an electrical anti-skid control system. Specifically, the strain gauge sensor for drag, say gauges 14 of FIGS. 3 and 4, are connected to an amplifier 15 and the strain gauge sensors for torque, in FIGS. 3 and 4 the strain gauges 13, are connected to an amplifier 16. The output of amplifiers 15 and 16 are connected to a difference amplifier 17 for the reason that the difference between the drag and torque is proportional to the wheel acceleration. Actually deceleration is measured, and when an excessive deceleration signal is received the wheel is skidding or beginning to skid.

The output of the difference amplifier 17 is coupled to the input of an amplifier 19 through a sensitivity control 18, the control 18 providing a means for controlling the input voltage to the amplifier 19. It will be obvious that by proper design of the input circuit of amplifier 19, the need for control 18 can be eliminated. The output of amplifier 19 is connected to a pressure controller 20 controlling the braking force on the braked wheel so that the braking force is slacked or cut off to eliminate or reduce the skid of the braked wheel when the output of amplifier 19 indicates a skid has developed on the braked wheel.

Figure 6:
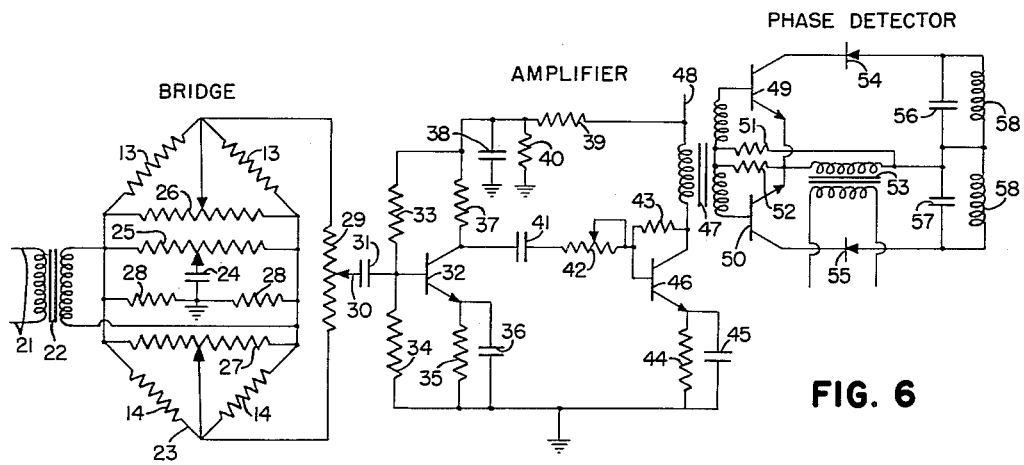
FIG. 6 is a schematic wiring diagram of another embodiment of the invention.

FIG. 6 shows in greater detail a circuit diagram of a typical A.C. system for anti-skid control utilizing strain gauges. In this circuit the numeral 21 indicates a 400 cycle A.C. supply passing through a transformer 22 (115 v./26 v. 400 c.p.s. A.C.) to a Wheatstone bridge 23 wherein strain gauges 13 and 14 form the bridge. The other elements in the bridge include a condenser 24 (1 mfd.), potentiometer 25 (25,000 ohms) as a capacitance balance, a potentiometer 26 (25,000 ohms) for balancing the resistance of gauges 13, a potentiometer 27 (25,000 ohms) for balancing the gauges 14, and balancing resistances 28 (12,500 ohms).

The output of the bridge 23 is connected to a resistance 29 (2,000 ohms) with an adjustable output contact 30 for adjusting the ratio of the bridge. The output 30 connects to a condenser 31 (50 mfd.) and through it to a transistor 32 (type 2N336).

The remaining circuitry of amplifier and phase detector is self-explanatory and includes the following components and values: Resistance 33 (27,000 ohms), resistance 34 (10,000 ohms), resistance 35 (1,200 ohms), condenser 36 (50 mfd.), resistance 37 (2,700 ohms), condenser 38 (25 mfd.), resistance 39 (5,600 ohms), resistance 40 (150,000 ohms), condenser 41 (50 mfd.), gain adjusting potentiometer 42 (2,000 ohms), resistance 43 (150,000 ohms), resistance 44 (1,200 ohms), condenser 45 (12 mfd.), transistor 46 (type 2N336), transformer 47 (50,000 ohms/600 C.T. ohms interstage), and a biasing voltage of +28 volts applied at 48.

Figure 8:
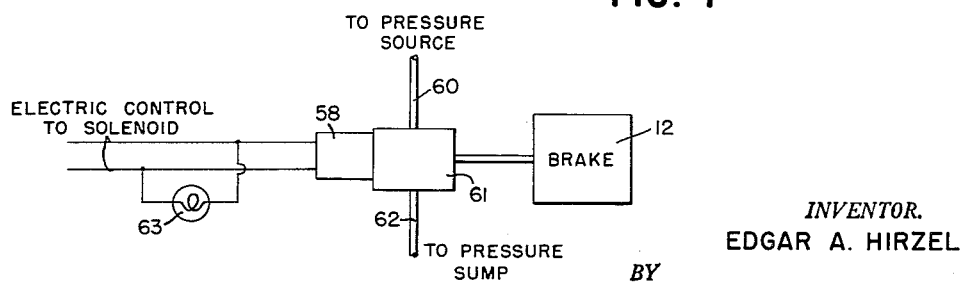
FIG. 8 is a diagrammatic showing of the apparatus of the invention applied to a fluid pressure brake and brake control system.

The phase detector portion of the circuitry includes transistors 49 and 50 (type 2N336) connected to the secondary of the transformer 47 in the manner illustrated, bias resistance 51, bias resistance 52, transformer 53 (part of transformer 22), rectifiers 54 and 55 (type IN645), condensers 56 and 57 (12 mfd.) and connected to control windings 58 of a brake pressure control valve, as seen more particularly in FIG. 8.

Figure 7:
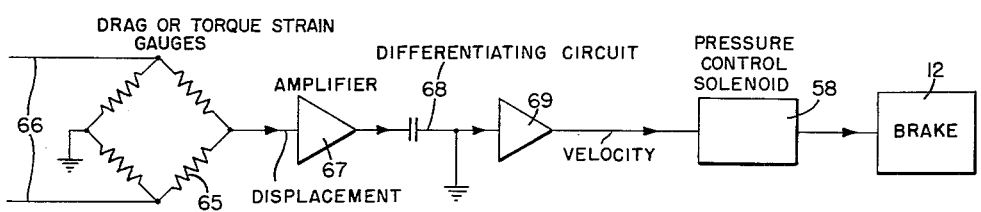
FIG. 7 is a schematic wiring diagram of still another embodiment of the invention.

FIG. 7 shows circuitry utilizing strain gauge means to determine only drag or only torque, and not both, for producing a signal for controlling brake anti-skid. Not fully equivalent results are obtained by this system, as compared to the more sensitive and positive circuits utilizing both drag and torque signals for control. In the circuit of FIG. 7 the numeral 65 indicates a Wheatstone bridge with at least one of the resistances being a strain gauge positioned on the wheel strut or axle in position to be strained by either wheel torque or wheel drag, all as hereinbefore described. A suitable excitation voltage 66 is applied to the bridge. The output of the bridge is connected through an amplifier 67 to a differentiating circuit 68, shown in its simplest form, hence to an amplifier 69 the output of which operates pressure control solenoid 58 of a brake 12. The sensitivity of the bridge 65, and the gain in the amplifiers can be adjusted so that control solenoid 58 is operated only when a true skid develops in the braked wheel.

FIG. 8 shows the brake 12 to be of the conventional fluid pressure type supplied by a conduit 60 with fluid under pressure from a suitable source, the pressure being under control of, for example, the airplane pilot by means of a brake pedal (not shown). The conduit 60 connects to a pressure control valve 61 which connects the brake 12 either to the conduit 60 or to a conduit 62 returning the fluid under pressure to a suitable sump or master cylinder reservoir. The valve 61 is operated by the coils or solenoid 58 from the output of the electrical system of FIG. 6, and in addition to operating the solenoid 58, or as an alternative thereto a signal light, buzzer, or the like 63 can be operated. It will be understood that as an alternative to the automatic operation of a pressure control valve 61 in accord with the system of FIG. 8, that a manual operation can be followed wherein the valve 61 is eliminated and with the operation of a signal light or the like 63 being utilized to signal the operator that a brake or wheel skid has developed whereupon the operator will slack off on his application of brake pressure to relieve the skid condition.

It is believed that the operation of the apparatus of the invention will be evident from the foregoing description. Suffice it to say here that the apparatus of the invention measures brake drag in the means rotatably supporting the wheel, measures brake torque in the means rotatably supporting the wheel, compares these forces to obtain a measure of wheel deceleration, and when wheel deceleration exceeds that effected in a normal braking operation a signal is produced which automatically or through pilot manipulation of the brakes relieves or reduces braking force to relieve the skid condition. The apparatus of the invention operates most satisfactorily when the strain gauges are positioned so that those measuring drag respond to substantially only drag moments, and those measuring brake torque respond substantially only to torque moment. The use of conventional wire type strain gauges facilitates the separation of the drag and torque moment inasmuch as the change in length of the wire of the strain gauge is very little affected by forces acting at right angles or close to right angles to the length of the wire. It should be noted here, however, that the invention contemplates the use of any known type of strain gauges for measuring stresses in a wheel supporting member, and that the invention particularly contemplates the use of transistors as strain gauges, i.e. the use of semi-conductor piezoresistive elements as strain gauges, and this is to be the subject of a separate patent application.

It is possible to mathematically demonstrate the forces utilized in the present invention to determine excessive wheel deceleration and apparatus constructed to incorporate the principles of the invention confirms the mathematical analysis. The function of the apparatus in the manner described is predicated upon one or both of two things which happen when a wheel goes into a skid. The first is that when a braked wheel begins to lock up and skid the mass of the wheel acting in effect as an overrunning weight results in a change in brake torque (normally an increase) and a change in the curvature represented by the chain dotted line in FIG. 2 thereby having a noticeable change in the strain gauges 8 reflecting brake torque. The second change as a wheel begins to lock up is that the friction between the tire or wheel and the surface on which it is rolling changes from static friction to sliding friction which is normally less with a resulting change in brake drag with a decrease in the bending of the wheel support as indicated by the dotted line 5 in FIG. 2. This results in a definite change in the indication of strain gauges 6. The indicated changes clearly reflect themselves as an unbalance in the Wheatstone bridge circuitry, or other suitable electrical determining means, and braking force can be automatically or manually reduced. The fact that when a skid develops brake torque increases and brake drag decreases emphasizes or enhances the signal change in the strain gauges and in the Wheatstone bridge if a bridge is used.

While certain representative embodiments and details have been shown for the purpose of illustrating the invention, it will be apparent to those skilled in this art that various changes and modifications may be made therein without departing from the spirit or scope of the invention.

What is claimed is:

1. Anti-skid apparatus including in combination, a wheel, a brake for the wheel, fluid pressure means for operating the brake, means supporting the wheel and subject to bending moments due to wheel drag and subject to torsion moments due to brake torsion upon brake application, strain gauge means mounted on the supporting means and responsive to bending moments upon brake application, strain gauge means mounted on the supporting means and responsive to torsion moments upon brake application, electrical means connected to the strain gauge means and responsive to a change therein indicating the beginning of a wheel skid, and solenoid valve means controlled by the output of the electrical means for cutting off the supply of fluid pressure to the brake and releasing the pressure on the brake.

2. Anti-skid apparatus including in combination, a wheel, a brake for the wheel, fluid pressure means for operating the brake, means supporting the wheel and subject to bending moments and to torsion moments upon brake application, strain gauge means mounted on the supporting means and responsive to bending moments upon brake application, strain gauge means mounted on the supporting means and responsive to torsion moments upon brake application, electrical means connected to the strain gauge means and responsive to a change therein indicating the beginning of a wheel skid, and solenoid valve means controlled by the output of the electrical means for reducing the supply of fluid pressure to the brake and releasing the pressure on the brake.

3. Anti-skid apparatus including in combination, a wheel, a brake for the wheel, fluid pressure means for operating the brake, means supporting the wheel and subject to bending moments and to torsion moments upon brake application, strain gauge means mounted on the supporting means and responsive to bending moments upon brake application, strain gauge means mounted on the supporting means and responsive to torsion moments upon brake application, electrical means connected to the strain gauge means and responsive to a change therein indicating the beginning of a wheel skid, and means controlled by the output of the electrical means for indicating a skid condition on the braked wheel.

4. Anti-skid apparatus including in combination, a wheel, a brake for the wheel, fluid pressure means for operating the brake, means supporting the wheel and subject to bending moments and to torsion moments upon brake application, strain gauge means mounted on the supporting means and responsive to bending moments upon brake application, strain gauge means mounted on the supporting means and responsive to torsion moments upon brake application, means connecting the strain gauge means in a balanced Wheatstone bridge, electric means responsive to the unbalance of the bridge to signal a skid condition of the braked wheel, and means for adjusting the sensitivity of the bridge to allow normal non-skid braking operations without the electric means signalling a skid.

5. Apparatus for detecting the beginning of a skid in a braked wheel having a member supporting the wheel for rotation, and including means adapted to be applied to the member to measure the result of brake torque thereon, means adapted to be applied to the member to measure the result of drag between the braked wheel and the surface on which it is rolling on the member, and electric means responsive to the output of the torque measuring means and the drag measuring means for signalling the beginning of a skid.

6. Apparatus for detecting the beginning of a skid in a braked wheel having a member supporting the wheel for rotation, and including means adapted to be applied to the member to measure torsion in the member, means adapted to measure bending in the member, and electric means responsive to the outputs of the torsion measuring means and the bend measuring means for signalling the beginning of a skid.

7. Apparatus for detecting the beginning of a wheel skid and including a wheel, means for rotatably supporting the wheel, a brake on the wheel, means for applying the brake, a strain gauge on the supporting means and measuring drag on the supporting means due to brake application, a strain gauge on the supporting means and measuring brake torque on the supporting means due to brake application, electrical means connected to the strain gauges and determining the difference between the drag and torque on the supporting means, and means for releasing the brake applying means when the difference determined by the electrical means is sufficient to indicate the development of a wheel skid.

8. Apparatus for detecting the beginning of a wheel skid and including a wheel, means for rotatably supporting the wheel, a brake on the wheel, means for applying the brake, a strain gauge on the supporting means and measuring drag on the supporting means due to brake application, electrical means connected to the strain gauge and determining a selected change in the amount of drag, and means responsive to the selected change in the amount of drag for at least partially releasing the brake applying means.

9. Apparatus for detecting the beginning of a wheel skid and including a wheel, means for rotatably supporting the wheel, a brake on the wheel, means for applying the brake, a strain gauge on the supporting means and measuring brake torque on the supporting means due to brake application, electrical means connected to the strain gauge and determining a selected change in the amount of brake torque, and means responsive to the selected change in the amount of brake torque for at least partially releasing the brake applying means.

No references cited.